(12) United States Patent
Choi et al.

(10) Patent No.: US 10,955,963 B2
(45) Date of Patent: Mar. 23, 2021

(54) TOUCH DRIVING DEVICE AND DISPLAY DEVICE

(71) Applicant: SILICON WORKS CO., LTD., Daejeon (KR)

(72) Inventors: Jung Min Choi, Daejeon (KR); Kyung Hwan Kim, Daejeon (KR); Jae Duck Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/533,054

(22) Filed: Aug. 6, 2019

(65) Prior Publication Data

US 2020/0050339 A1    Feb. 13, 2020

(30) Foreign Application Priority Data

Aug. 10, 2018    (KR) .................. 10-2018-0093851

(51) Int. Cl.
| | |
|---|---|
| *G06F 3/041* | (2006.01) |
| *G06F 3/0354* | (2013.01) |
| *G06F 3/044* | (2006.01) |
| *G06F 3/038* | (2013.01) |
| *G09G 3/3208* | (2016.01) |
| *G09G 3/36* | (2006.01) |

(52) U.S. Cl.
CPC .......... *G06F 3/04162* (2019.05); *G06F 3/038* (2013.01); *G06F 3/03545* (2013.01); *G06F 3/0412* (2013.01); *G06F 3/0418* (2013.01); *G06F 3/0442* (2019.05); *G06F 3/0443* (2019.05); *G09G 3/3208* (2013.01); *G09G 3/36* (2013.01)

(58) Field of Classification Search
CPC .. G06F 3/0442; G06F 3/0443; G06F 3/04164; G06F 3/038; G06F 3/0412
USPC ................................................... 345/173, 174
See application file for complete search history.

(56) References Cited

U.S. PATENT DOCUMENTS

| | | | |
|---|---|---|---|
| 9,727,163 B2* | 8/2017 | Mizuhashi | G06F 3/04182 |
| 9,880,649 B2 | 1/2018 | Agarwal et al. | |
| 10,606,389 B2* | 3/2020 | Ju | G06F 3/0442 |
| 2017/0285771 A1* | 10/2017 | Jung | G06F 3/038 |
| 2018/0024654 A1 | 1/2018 | Koike et al. | |
| 2018/0145807 A1* | 5/2018 | Nagata | H04L 5/0048 |
| 2018/0188836 A1* | 7/2018 | Park | G06F 3/0442 |
| 2019/0146602 A1 | 5/2019 | Kadowaki et al. | |
| 2019/0171320 A1* | 6/2019 | Kim | G06F 3/0442 |
| 2020/0026369 A1 | 1/2020 | Hisano | |
| 2020/0026406 A1 | 1/2020 | Choi | |

FOREIGN PATENT DOCUMENTS

| | | |
|---|---|---|
| JP | 5925279 B2 | 5/2016 |
| KR | 10-2016-0031135 A | 3/2016 |
| KR | 10-2017-0081127 A | 7/2017 |
| KR | 10-2018-0046338 A | 5/2018 |
| KR | 10-2018-0079586 A | 7/2018 |
| KR | 10-2019-0038130 A | 4/2019 |

\* cited by examiner

*Primary Examiner* — Calvin C Ma
(74) *Attorney, Agent, or Firm* — Fenwick & West LLP

(57) ABSTRACT

The present disclosure provides a display device configured to float a display electrode coupled to a touch sensor by a parasitic capacitance when a downlink signal is received from a touch pen to the touch sensor.

13 Claims, 11 Drawing Sheets

TOUCH DRIVING DEVICE AND DISPLAY DEVICE

CROSS REFERENCE TO RELATED APPLICATION

This application claims priority from Republic of Korea Patent Application No. 10-2018-0093851, filed on Aug. 10, 2018, which is hereby incorporated by reference in its entirety.

BACKGROUND

Field of Technology

The present disclosure relates to a technique for driving touch sensors and a display device.

Description of the Prior Art

As the thickness of a panel becomes thinner, the parasitic capacitance between a display electrode—for example, data line, gate line, common electrode, cathode electrode, etc.—and a touch sensor becomes larger.

For a display device receiving a downlink signal from an active pen, which is a kind of a touch pen, through a touch sensor, the aforementioned parasitic capacitance causes a problem in that the waveform of a downlink signal cannot be normally formed.

For example, an active pen and a touch sensor are connected to each other through a mutual capacitance and through this mutual capacitance, a downlink signal may be transmitted or received. However, when the parasitic capacitance in a touch sensor becomes large, a downlink signal transferred by the mutual capacitance leaks to the parasitic capacitance, and this causes a problem in that the voltage of the touch sensor may not be sufficiently increased.

To solve such a problem, a method of increasing the driving voltage of a downlink signal is suggested. However, since the increase of the driving voltage results in the increase of the power consumption, this method is not preferred.

SUMMARY

With this background, an object of the present disclosure is to provide a technique of improving the characteristic of downlink signals received from an active pen.

To this end, an embodiment of the present disclosure provides a touch driving device, which transmits uplink signals to an active pen and receives downlink signals from the active pen, comprising a touch driving part for transmitting the uplink signals through a touch sensor and a touch sensing part for receiving the downlink signals through the touch sensor, wherein a display electrode coupled with the touch sensor by a parasitic capacitance is floated in a time interval in which the downlink signals are received.

In the touch driving device, the touch driving part may supply a touch driving signal to the touch sensor, the touch sensing part may receive a response signal corresponding to the touch driving signal to sense the proximity or touch of an external object to or on the touch sensor, and a modulation signal having a phase the same as that of the touch driving signal or different from that thereof by 180 degrees may be supplied to the display electrode in a time interval in which the touch driving signal is supplied to the display electrode.

In the touch driving device, the downlink signal may be transmitted from the active pen to the touch sensor through the capacitance between the active pen and the touch sensor.

In the touch driving device, the touch sensor may be a common electrode to which a common voltage is supplied in a liquid crystal display (LCD) panel and the display electrode may be a data line to which a data voltage is supplied or a gate line to which a scan signal is supplied in the LCD panel.

In the touch driving device, the touch sensor may be a cathode electrode in an organic light emitting diode (OLED) panel and the display electrode may be a driving voltage line through which driving voltages are supplied to each OLED.

In the touch driving device, the uplink signal may include display panel information or a synchronization signal and the downlink signal may include status information of the active pen.

In the touch driving device, a display driving voltage required for driving each pixel may be supplied to the display electrode in a display time interval, a touch driving signal may be supplied to the touch sensor and a modulation signal having a phase the same as that of the touch driving signal or different from that thereof by 180 degrees may be supplied to the display electrode in a first touch time interval, and the downlink signal may be received by the touch sensor and the display electrode may be floated in a second touch time interval.

In the touch driving device, the active pen synchronizes an internal clock according to the uplink signal, and timing for transmitting the downlink signal may be determined according to the internal clock.

Another embodiment of the present disclosure provides a display device comprising a display electrode layer on which a display electrode is disposed; a touch sensor layer on which a touch sensor is disposed; a display driving device for supplying display driving voltages to the display electrode; and a touch driving device for transmitting uplink signals to an active pen through the touch sensors and receiving downlink signals from the active pen, wherein parasitic capacitances are formed between the display electrode and the touch sensor and the display electrodes are floated when the touch driving device receives the downlink signals.

In the display device, the display electrode may be a common electrode, and a liquid crystal layer or a color filter layer may be interposed between the display electrode and the touch sensor.

In the display device, the display electrode may be a common electrode, the common electrode may be connected to a common voltage supplying device for supplying common voltages, and the common voltage supplying device may cut off the common voltage to float the common electrode when the downlink signal is received.

In the display device, the display electrode may be a cathode electrode of an organic light emitting diode (OLED), and an insulation film may be interposed between the display electrode and the touch sensor.

In the display device, the cathode electrode may be connected to a base voltage supplying device for supplying base voltages and the base voltage supplying device may cut off the base voltage to float the cathode electrode when the downlink signal is received.

In the display device, the display driving device may supply the display driving voltage to the display electrode and a modulation signal having a phase the same as that of the touch driving signal or different from that thereof by 180 degrees to the display electrode when the touch driving device supplies a touch driving signal to the touch sensor, and float the display electrode when the downlink signal is received by the touch sensor in a display time interval.

Another embodiment of the present disclosure provides a touch driving device, which transmits uplink signals to an active pen and receives downlink signals from the active pen, comprising a touch driving part for synchronizing a clock of the touch driving device with that of the active pen by supplying the uplink signal to a touch sensor; a touch sensing part for receiving a downlink signal from the touch sensor in a downlink time interval indicated by the clock of the touch driving device; and a modulation signal driving part for supplying a modulation signal having a phase the same as that of the downlink signal or different from that thereof by 180 degrees to a display electrode forming a parasitic capacitance with the touch sensor therebetween in the downlink time interval.

As described above, according to the present disclosure, the characteristic of the downlink signals received from the active pen may be improved.

DETAILED DESCRIPTION

Figure 1:
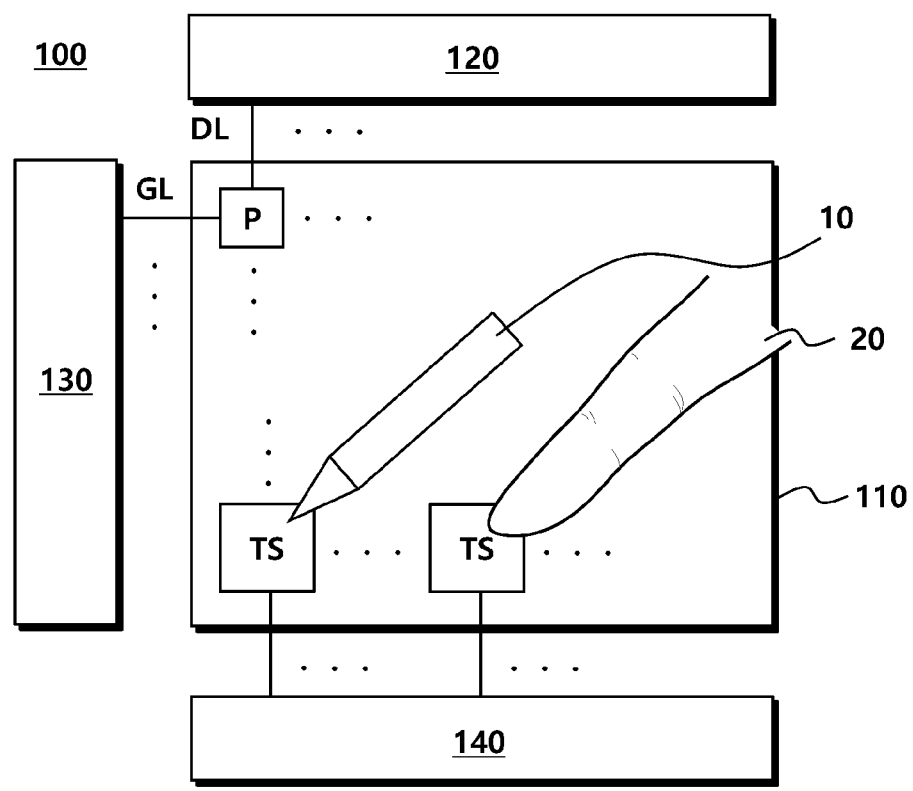
FIG. 1 is a block diagram of a display device according to an embodiment of the present disclosure.

Hereinafter, embodiments of the present disclosure will be described in detail with reference to the accompanying drawings. In adding reference numerals to elements in each drawing, the same elements will be designated by the same reference numerals as far as possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence or the like of a corresponding structural element are not limited by the term. When it is described in the specification that one component is "connected," "coupled" or "joined" to another component, it should be read that the first component may be directly connected, coupled or joined to the second component, but also a third component may be "connected," "coupled," and "joined" between the first and second components.

FIG. 1 is a block diagram of a display device according to an embodiment of the present disclosure.

Referring to FIG. 1, the display device 100 may comprise a panel 110, a data driving device 120, a gate driving device 130, and a touch driving device 140.

Each of the data driving device 120, the gate driving device 130, and the touch driving device 140 may drive at least one element included in the panel 110.

The data driving device 120 may drive data lines DL respectively connected to pixels P, the gate driving device 130 may drive gate lines GL respectively connected to pixels P, and the touch driving device 140 may drive touch sensors TS disposed on the panel 110.

The data driving device 120 may supply data voltages to the data lines in order to display images on the pixels P. The data driving device 120 may include at least one data driver integrated circuit. At least one such data driver integrated circuit may be connected to a bonding pad of the panel 110 in a tape-automated-bonding (TAB) manner or a chip-on-glass (COG) manner, directly formed on the panel 110, or integrated on the panel 110 depending on the circumstances. Further, the data driving device 120 may be implemented as a chip-on-film (COF) type.

The gate driving device 130 may supply scan signals to the gate lines GL in order to turn on or off a transistor located at each pixel P. Depending on the driving method, the gate driving device 130 may be located on only one side of the panel 110 as illustrated in FIG. 1, or may be divided into two parts and located on both sides of the panel 110. Further, the gate driving device 130 may include at least one gate driver integrated circuit. At least one such gate driver integrated circuit may be connected to a bonding pad of the panel 110 in a tape-automated-bonding (TAB) manner or a chip-on-glass (COG) manner, directly formed on the panel 110 in a gate-in-panel (GIP) manner, or integrated on the panel 110 depending on the circumstances. In addition, the gate driving circuit 130 may be implemented as a chip-on-film (COF) type.

An electrode to which voltages for driving the display panel are supplied may be called a display electrode. A display electrode may be, for example, a data line DL, a gate line GL, a driving voltage line, a common electrode to which common voltages are supplied in an LCD panel, and an anode/cathode electrode of an OLED in an OLED panel. A device driving display electrodes may be called a display driving device.

Display driving voltages may be supplied to a display electrode. For example, data voltages may be supplied to a data line DL. Scan signals may be supplied to a gate line GL. Pixel driving voltages VDD may be supplied to a driving voltage line, common voltages may be supplied to a common electrode, pixel driving voltages VDD may be supplied to an anode electrode of an OLED, and base voltages VSS may be supplied to a cathode electrode thereof. Data voltages may be supplied by a data driving device 120 and scan signals may be supplied by a gate driving device 130. Common voltages may be supplied by a common voltage supplying device. Pixel driving voltages VDD may be supplied by a driving voltage supplying device and base voltages VSS may be supplied by a base voltage supplying device. A common voltage supplying device, a driving voltage supplying device, and a base voltage supplying device may be implemented as one device or separate devices.

A panel 110 may include only a display panel or further include a touch panel (TSP: touch screen panel) as well. A display panel and a touch panel may share some components. For example, a touch sensor TS for sensing touches in a touch panel may be used as a common electrode to which common voltages are supplied in a display panel when this display panel is an LCD panel. For another example, a touch sensor TS may be used as a cathode electrode to which base voltages are supplied in a display panel when this display panel is an OLED panel. In view of the fact that a display panel and a touch panel share some components, such a panel 110 may be called an integral panel, however, the present disclosure is not limited thereto. Further, an in-cell type panel is a known form in which a display panel and a touch panel are combined as an integral type, but it is only an example of the aforementioned panel 110, and the panel to which the present disclosure is applied is not limited to the in-cell type panel.

On a panel 110, a plurality of touch sensors TS are disposed and a touch driving device 140 may drive the touch sensors TS using touch driving signals. The touch driving device 140 may generate a sensing value for a touch sensor TS according to a response signal formed in the touch sensor TS in response to a touch driving signal. The touch driving device 140 may calculate a touch coordinate of an external object 20—for example, a finger—using sensing values for a plurality of touch sensors disposed on the panel 110 and the calculated touch coordinate may be transferred to another device—for example, a host—to be used.

The touch driving device 140 may exchange signals with an active pen 10 through the touch sensors TS. The touch driving device 140 may supply uplink signals to the touch sensors and the active pen 10 may receive the uplink signals through contact with the touch sensors. An uplink signal may include, for example, information such as panel information, the protocol version, etc. or a synchronization signal. The active pen 10, receiving the uplink signals, may confirm panel information or the protocol version or synchronize signals.

The active pen 10 may transmit downlink signals to a touch sensor TS. The touch driving device 140 may receive the downlink signals through the touch sensor. A downlink signal may include status information of the active pen. The status information of an active pen may include, for example, the position of the active pen, the button status of the active pen, the battery status of the active pen, the inclination of the active pen, etc.

A display device 100 may divide time to drive each element in a panel 110.

Figure 2:
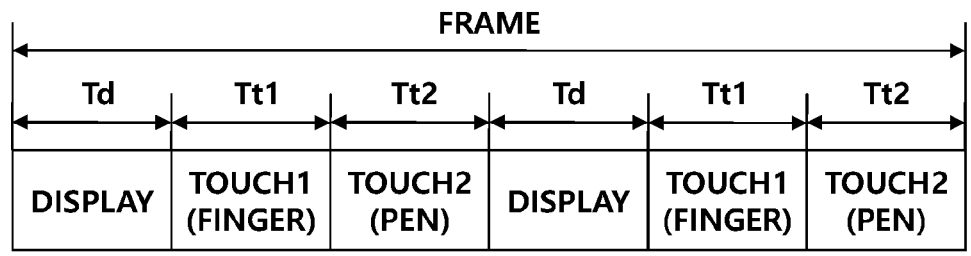
FIG. 2 illustrates operation modes of time intervals in the display device according to an embodiment of the present disclosure.

FIG. 2 illustrates operation modes of time intervals in the display device according to an embodiment of the present disclosure.

Referring to FIG. 2, a frame is divided into multiple time intervals and a plurality of operation modes may be respectively applied to the different time intervals.

For example, the display device may operate in a display mode in a display time interval Td, and may operate in a touch mode in touch time intervals Tt1 and Tt2. The touch mode may be divided into two modes. For example, the display device may operate in a first touch mode in a first touch time interval Tt1 and may operate in a second touch mode in a second touch time interval Tt2. The display device may sense a proximity or touch of an external object to or on a touch sensor in the first touch mode and may exchange signals with the active pen.

In the display time interval Td, the display device may supply display driving voltages to the display electrodes. For example, the data driving device may supply data voltages to the data lines, the gate driving device may supply scan signals to the gate lines, and the common voltage supplying device may supply common voltages to the common electrodes. Or, the base voltage supplying device may base voltages to the cathode electrodes.

In the touch time intervals Tt1 and Tt2, the display driving device may supply modulation signals to the display electrodes or may float the display electrodes. Here, a modulation signal may be a signal having a phase same as that of a signal supplied to a touch sensor or different from that thereof by 180 degrees. For example, when the touch driving device supplies a touch driving signal to a touch sensor in the first touch time interval Tt1, the common voltage supplying device may supply a modulation signal corresponding to the touch driving signal to a common electrode. Or, the common voltage supplying device may float the common electrode in the first touch time interval Tt1. For another example, when a downlink signal is received by a touch sensor in the second touch time interval Tt2, the common voltage supplying device may supply a modulation signal corresponding to the downlink signal to a common electrode. Or, the common voltage supplying device may float the common electrode in the second time interval Tt2.

Between the display electrodes and the touch sensors TS, parasitic capacitances may be formed. Such parasitic capacitances may interrupt the signal transmission or reception between the touch sensors TS and the active pen 10.

Figure 3:
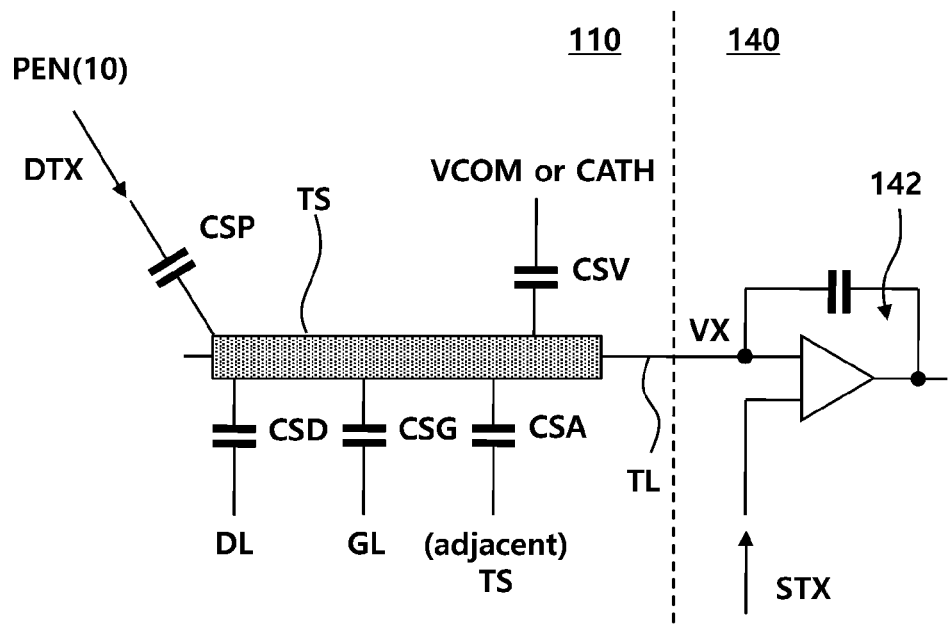
FIG. 3 illustrates a signal supplied to a touch sensor and a parasitic capacitance around the touch sensor.
Figure 4:
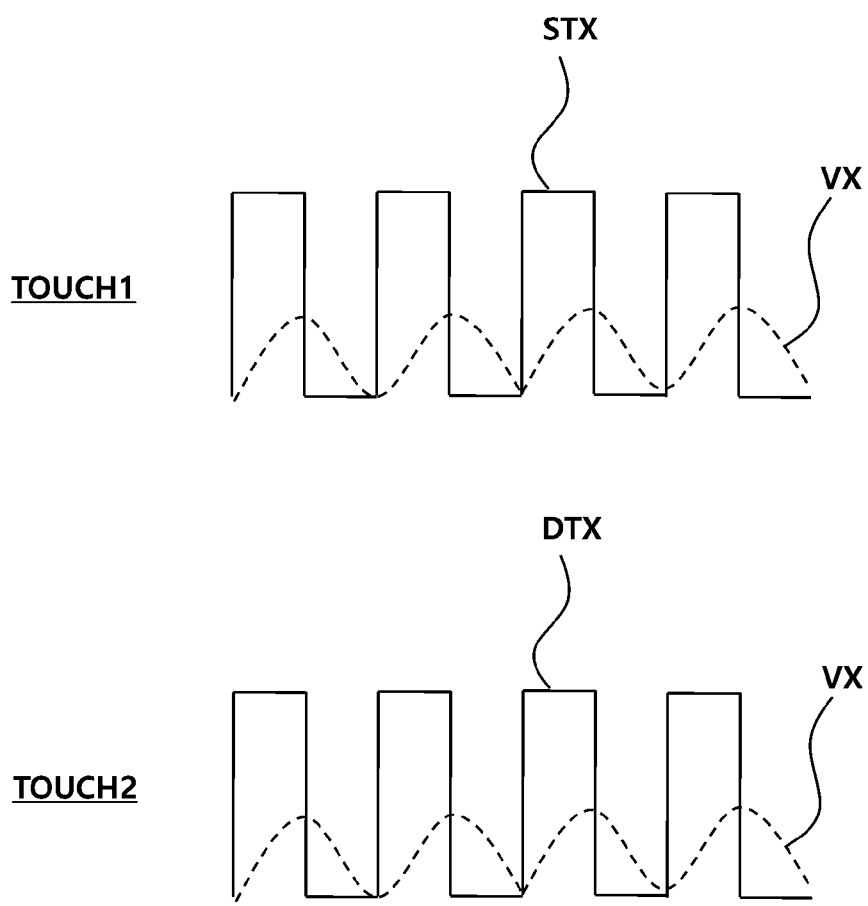
FIG. 4 illustrates signals supplied to a touch sensor and waveforms of the voltages formed in the touch sensor.

FIG. 3 illustrates a signal supplied to a touch sensor and a parasitic capacitance around the touch sensor and FIG. 4 illustrates signals supplied to the touch sensor and waveforms of voltages formed in the touch sensor.

Referring to FIG. 3, around a touch sensor TS, a plurality of parasitic capacitances may be formed. For example, between a touch sensor TS and a common electrode VCOM or a cathode electrode CATH, a first parasitic capacitance CSV may be formed, between the touch sensor TS and an adjacent other touch sensor TS, a second parasitic capacitance CSA may be formed, between the touch sensor TS and a gate line GL, a third parasitic capacitance CSG may be formed, and between the touch sensor TS and a data line DL, a fourth parasitic capacitance CSD may be formed.

In FIG. 3, parasitic capacitances are formed between a touch sensor TS and display electrodes VCOM, CATH, DL, and GL, however, the parasitic capacitances may be formed between a touch sensing line TL, which connects the touch sensor TS and the touch driving device 140, and the display electrodes VCOM, CATH, DL, and GL.

Referring to FIG. 3 and FIG. 4, a touch driving signal STX may be supplied to the touch sensor TS by the touch driving device 140 in the first touch mode TOUCH1. The touch sensor TS is connected to one input terminal of an amplifier comprised in an analog front-end circuit (AFE) 142 and the touch driving signal STX is supplied to another input terminal of the amplifier so that the touch driving signal STX may be supplied to the touch sensor TS.

At this moment, the level of a voltage VX formed in the touch sensor TS may be lower than that of the supplied touch driving signal STX. Such a difference between the voltage levels results from a parasitic capacitance formed in the touch sensor TS or the touch sensing line TL.

Referring to FIG. 3 and FIG. 4, a downlink transmitting signal DTX may be supplied to the touch sensor TS by the active pen 10 in the second touch mode TOUCH2. A mutual capacitance CSP may be formed between the active pen 10 and a touch sensor and the downlink transmitting signal DTX may be transmitted from the active pen 10 to the touch sensor TS through the mutual capacitance CSP.

At this moment, the level of a voltage VS formed in the touch sensor may be lower than that of the supplied downlink transmitting signal DTX. Such a difference between the voltage levels results from a parasitic capacitance formed in the touch sensor TS or the touch sensing line TL.

The display device may supply modulation signals to the display electrodes VCOM, CATH, DL, and GL and/or the adjacent touch sensors TS in order to minimize the effect of the parasitic capacitance.

Figure 5:
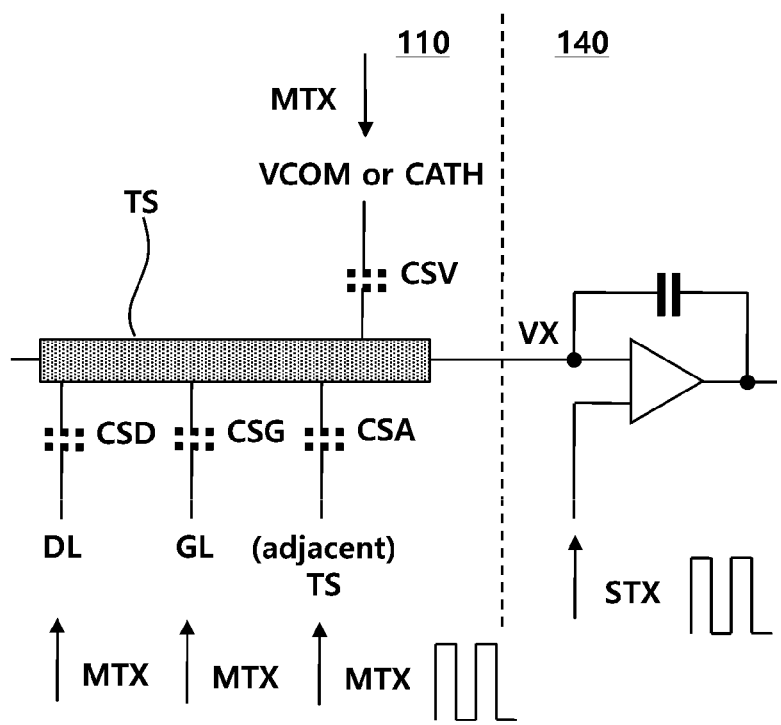
FIG. 5 illustrates a display device according to an embodiment of the present disclosure supplying modulation signals to electrodes adjacent to a touch sensor in a first touch mode.
Figure 6:
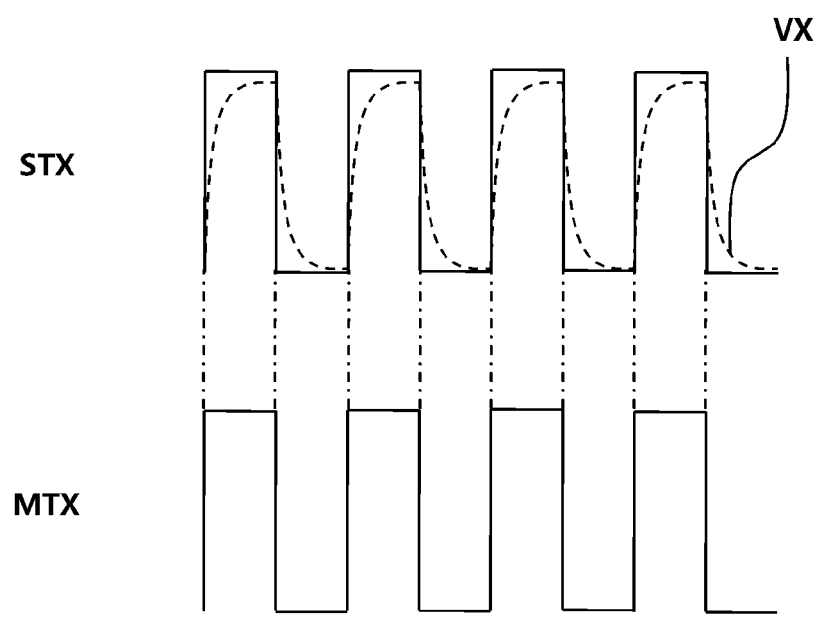
FIG. 6 illustrates waveforms of voltages formed in a touch sensor when modulation signals are supplied as shown in FIG. 5.

FIG. 5 illustrates a display device according to an embodiment of the present disclosure supplying modulation signals to electrodes adjacent to a touch sensor in a first touch mode and FIG. 6 illustrates waveforms of voltages formed in a touch sensor when modulation signals are supplied as shown in FIG. 5.

Referring to FIG. 5, in the first touch mode, the display device may supply modulation signals MTX to electrodes which form parasitic capacitances with a touch sensor TS. For example, the display device may supply modulation signals MTX to the display electrodes VCOM, CATH, DL, and GL and/or the adjacent touch sensors TS when supplying a touch driving signal STX to the touch sensor TS.

The touch driving signal STX and the modulation signal MTX may respectively have phases identical to each other or different from each other by 180 degrees. When signals having the same phases are supplied to the both sides of a capacitance, this results in an effect as if a direct current signal is applied to the capacitance. Since the capacitance is considered as a great impedance when a direct current is applied, an effect as if the capacitance is removed is obtained.

Referring to FIG. 6, when the parasitic capacitances are removed by the modulation signals MTX, the signal—touch driving signal STX—supplied to the touch sensor TS and the voltage formed in the touch sensor may have similar levels and waveforms.

Meanwhile, for such a control, it is important to match the phases of touch driving signals STX and modulation signals MTX with each other. If there is a difference between the phases of touch driving signals STX and modulation signals MTX, the effect of removing parasitic capacitances using modulation signals MTX could be decreased.

In order to match the phases of a touch driving signal STX and a modulation signal MTX, the display device may generate touch driving signals STX and modulation signals MTX according to a same control signal or generate them from a same source. For example, a device for generating touch driving signals STX, such as a touch driving device, and a device for generating modulation signals MTX, such as a data driving device, a gate driving device, a common voltage supplying device, or a base voltage supplying device, may receive a same control signal from a device, such as a timing controller, and respectively generate touch driving signals STX and modulation signals MTX according to the control signal.

Or, the display device may generate touch driving signals STX and modulation signals MTX from a same source. For example, a power management unit of the display device may control a ground voltage and a touch driving signal STX and a modulation signal MTX may maintain a uniform voltage difference from the ground voltage. When the power management unit varies the voltage level of the ground voltage to form a regular driving waveform, the touch driving signal STX and the modulation signal MTX may respectively have waveforms according to this driving waveform. Such a control may facilitate a control of matching the phases of a touch driving signal STX and a modulation signal MTX because these signals are generated from a same source.

In the second touch mode in which downlink signals are received by a touch sensor, parasitic capacitances may be also removed using modulation signals. However, the effect of removing parasitic capacitances could be decreased due to a phenomenon in that the phases of a touch driving signal and a modulation signal are mismatched in some measure.

Figure 7:
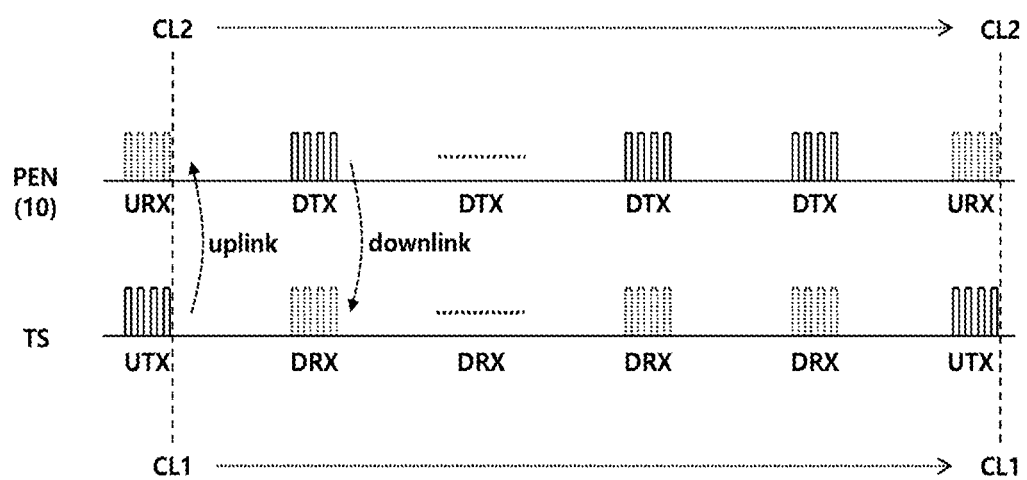
FIG. 7 illustrates the transmission and reception of signals between an active pen and a touch sensor according to an embodiment of the present disclosure.

FIG. 7 illustrates the transmission and reception of signals between an active pen and a touch sensor according to an embodiment of the present disclosure.

Referring to FIG. 7, the display device may supply an uplink transmitting signal UTX to a touch sensor TS in an uplink time interval and an uplink receiving signal URX in response to the uplink transmitting signal UTX may be formed in the active pen 10. According to the present disclosure, an uplink signal may be recognized as an uplink transmitting signal UTX by a touch sensor and as an uplink receiving signal URX by the active pen 10. In addition, according to the present disclosure, the transmission and reception of an uplink signal may include the transmission of an uplink transmitting signal UTX from a touch sensor and the reception of an uplink receiving signal URX by the active pen 10.

The display device may comprise a clock CL1 and may transmit an uplink transmitting signal UTX in accordance with this clock CL1. The active pen 10 may comprise another clock CL2 and may adjust this clock CL2 in accordance with an uplink receiving signal URX to synchronize the clock CL2 of the active pen 10 with the clock CL1 of the display device.

After the synchronization of the clocks, the active pen 10 may count a predetermined number of clock signals using the clock CL2, and then, supply a downlink transmitting signal DTX to a touch sensor. The display device may count a predetermined number of clock signals using the clock CL1 and receive a downlink receiving signal DRX. According to the present disclosure, a downlink signal may be recognized as a downlink transmitting signal DTX by the active pen 10 and as a downlink receiving signal DRX by a touch sensor. In addition, according to the present disclosure, the transmission and reception of a downlink signal may include the transmission of a downlink transmitting signal DTX from the active pen 10 and the reception of a downlink receiving signal DRX by a touch sensor.

Meanwhile, since the active pen 10 and the display device respectively determine timings for transmitting or receiving a downlink signal respectively using the different clocks CL1 and CL2, the timing for transmitting a downlink transmitting signal DTX, perceived by the active pen 10 and the timing for receiving a downlink receiving signal DRX, perceived by the display device may be a bit different from each other. If modulation signals are used in a state where the perceived timings for transmitting and receiving are different from each other, the effect of removing parasitic capacitances could be decreased.

Figure 8:
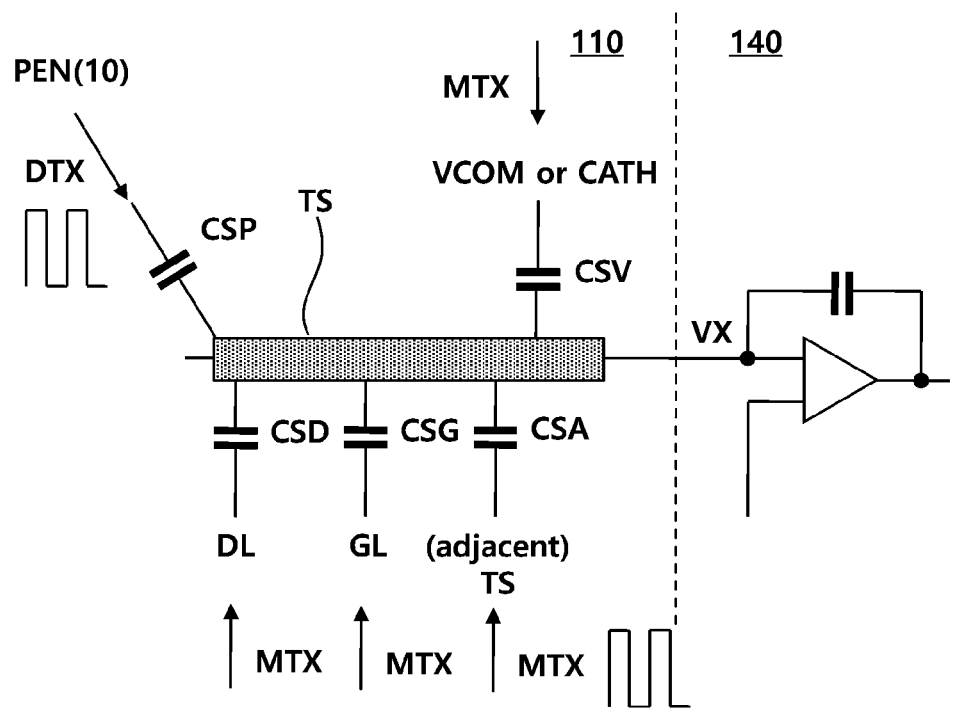
FIG. 8 illustrates a display device according to an embodiment of the present disclosure supplying modulation signals to electrodes adjacent to a touch sensor in a second touch mode.
Figure 9:
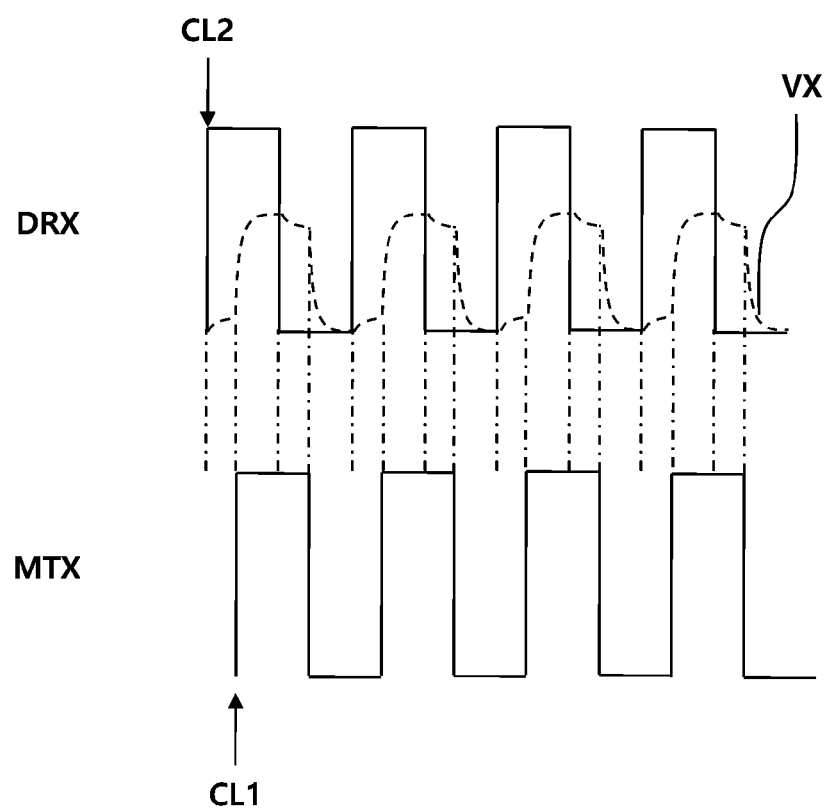
FIG. 9 illustrates waveforms of voltages formed in a touch sensor when modulation signal is supplied as shown in FIG. 8.

FIG. 8 illustrates a display device according to an embodiment of the present disclosure supplying modulation signals to electrodes adjacent to a touch sensor in a second touch mode and FIG. 9 illustrates waveforms of voltages formed in a touch sensor when modulation signals are supplied as shown in FIG. 8.

Referring to FIG. 8 and FIG. 9, in the second touch mode, the active pen 10 may transmit a downlink transmitting signal DTX to a touch sensor TS and the display device may supply modulation signals MTX to electrodes, which form parasitic capacitances with the touch sensor TS therebetween. For example, the display device may supply modulation signals MTX to the display electrodes VCOM, CATH, DL, and GL and/or to adjacent touch sensors TS when a downlink transmitting signal DTX is supplied to the touch sensor.

At this moment, although the phases of a downlink receiving signal DRX and a modulation signal MTX are matched in one embodiment, since the clocks CL1 and CL2 between the active pen 10 and the display device are synchronized in an uplink time interval, not in a downlink time interval, there could be a difference between the phases of a downlink receiving signal DRX and a modulation signal MTX depending on the deviation between the clocks CL1 and CL2.

When there is a difference between the phases, the level of a voltage VX formed in a touch sensor TS may be lower than the expected level of a voltage of the downlink receiving signal DRX as shown in FIG. 9.

To solve such a problem due to the phase difference, in the second touch mode, the display device may not supply modulation signals MTX to the display electrodes to float the display electrodes. For a specific example, the touch driving device may supply modulation signals MTX to the display electrodes in the first touch mode and float the display electrodes in the second touch mode.

Figure 10:
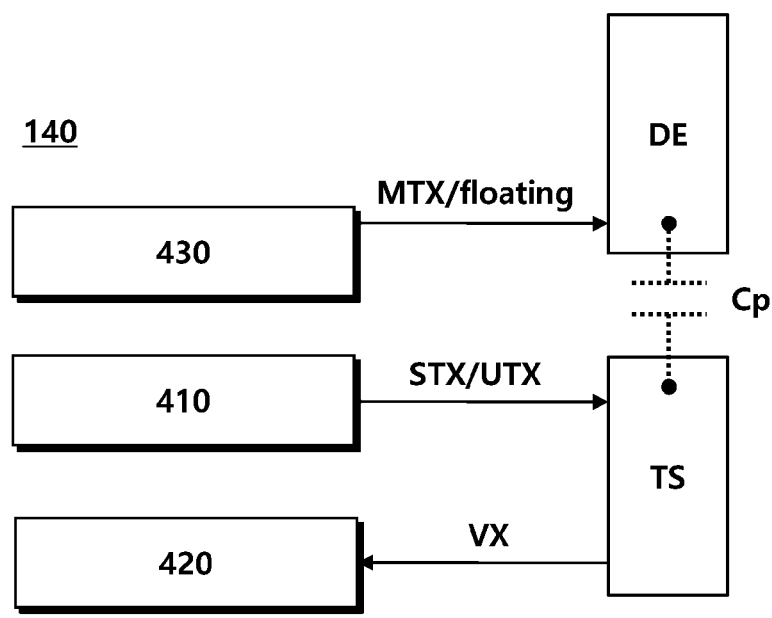
FIG. 10 is a block diagram of a touch driving device according to an embodiment of the present disclosure.

FIG. 10 is a block diagram of a touch driving device according to an embodiment of the present disclosure.

Referring to FIG. 10, the touch driving device 140 may comprise a touch driving part 410, a touch sensing part 420, and an auxiliary driving part 430.

The touch driving part 410 may supply a touch driving signal STX and an uplink transmitting signal UTX to a touch sensor TS. The touch sensing part 420 may sense a voltage VX formed in the touch sensor TS.

In the first touch mode, the touch driving part 410 may supply a touch driving signal STX to a touch sensor TS and the touch sensing part 420 may receive a response signal corresponding to the touch driving signal STX, for example, a voltage VX formed in the touch sensor TS, from the touch sensor TS to generate a touch sensing data for the proximity or touch of an external object. Here, the touch sensing data may be transmitted to a calculating device (not shown) and the calculating device (not shown) may calculate a touch coordinate of the external object using the touch sensing data.

Meanwhile, in the time interval where the touch driving device 410 supplies a touch driving signal STX to a touch sensor TX, the auxiliary driving part 430 may supply a modulation signal MTX to a display electrode DE to minimize the effect of a parasitic capacitance Cp formed between the touch sensor and the display electrode.

The touch driving part 410 may supply an uplink transmitting signal UTX to a touch sensor TS. The uplink transmitting signal UTX may be transmitted to the active pen connected with the touch sensor TS through a mutual capacitance. The active pen may receive information of the display device through the uplink signal and synchronize its clock with that of the display device.

After receiving the uplink signal, the active pen may transmit a downlink signal to the touch sensor TS, and in the time interval where the downlink signal is received, the auxiliary driving part 430 may float a display electrode DE forming a parasitic capacitance with the touch sensor TS therebetween.

Meanwhile, the display device may divide each frame into a plurality of time intervals and drive display electrodes DE in different ways in each time interval.

Figure 11:
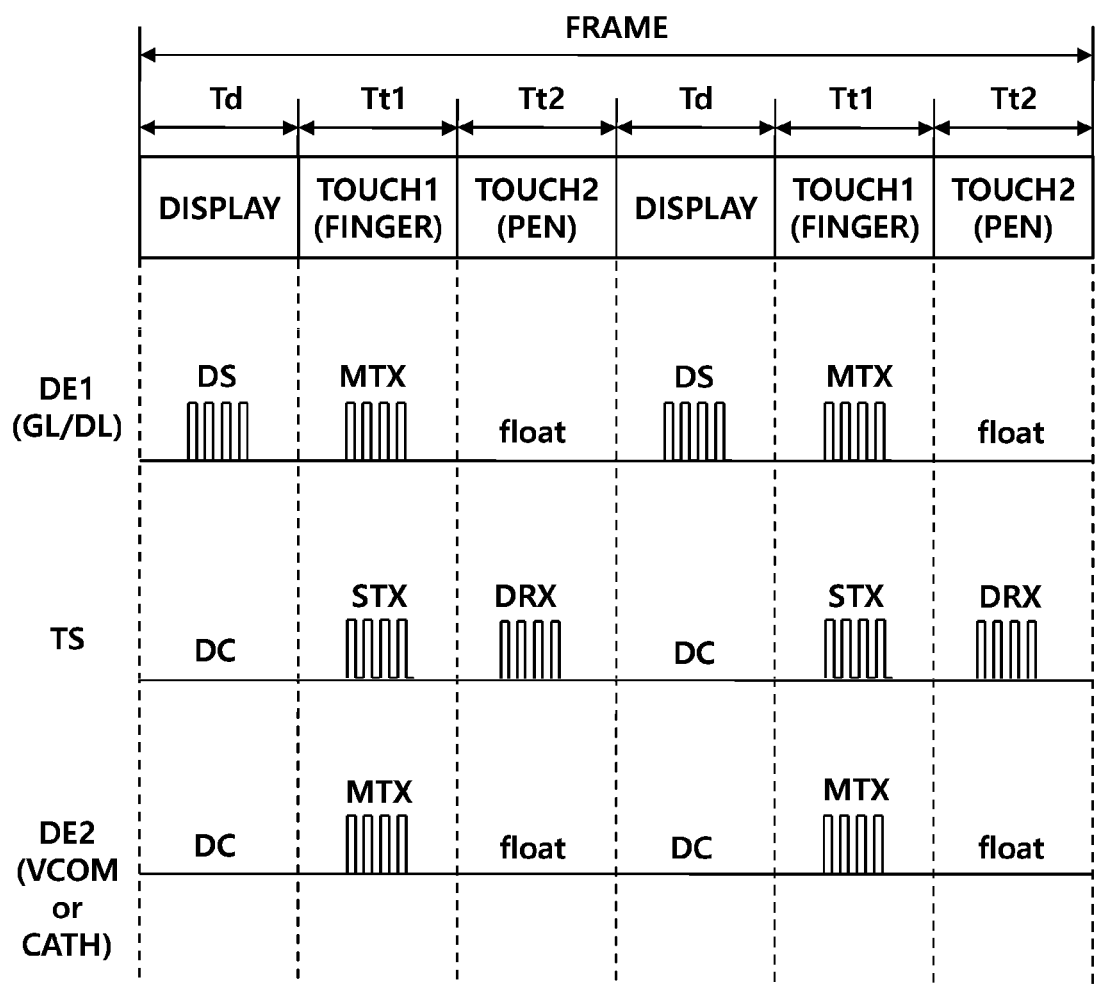
FIG. 11 illustrates signals transmitted and received during time intervals in a display device according to an embodiment of the present disclosure.

FIG. 11 illustrates signals transmitted and received during time intervals in a display device according to an embodiment of the present disclosure.

Referring to FIG. 11, a frame is divided into a plurality of time intervals Td, Tt1, Tt2 and different signals may be respectively supplied to different electrodes in these time intervals Td, Tt1, Tt2.

In a display time interval Td, a display driving voltage DS is supplied to a first display electrode DE1, and direct current may be supplied to a touch sensor TS and a second display electrode DE2. The display electrode DE1 may be, for example, a data line DL and a gate line GL, and a data voltage may be supplied to the data line DL and a scan signal may be supplied to the gate line GL. The second display electrode DE2 may be a common electrode VCOM or a cathode electrode CATH. A ground voltage may be supplied to the touch sensor and the second display electrode DE2 in the display time interval Td.

In a first touch time interval Tt1, a touch driving signal STX may be supplied to the touch sensor TS and modulation signals MTX may be supplied to the first display electrode DE1 and the second display electrode DE2.

In a second touch time interval Tt2, a downlink receiving signal DRX may be formed in the touch sensor TS and the first display electrode DE1 and the second display electrode DE2 may be floated.

Such an embodiment may be applied to a liquid crystal display (LCD) panel and also to an organic light emitting diode (OLED) panel. An example in which the embodiment is applied to an LCD panel is described with reference to FIG. 12 and an example in which the embodiment is applied to an OLED panel is described with reference to FIG. 13.

Figure 12:
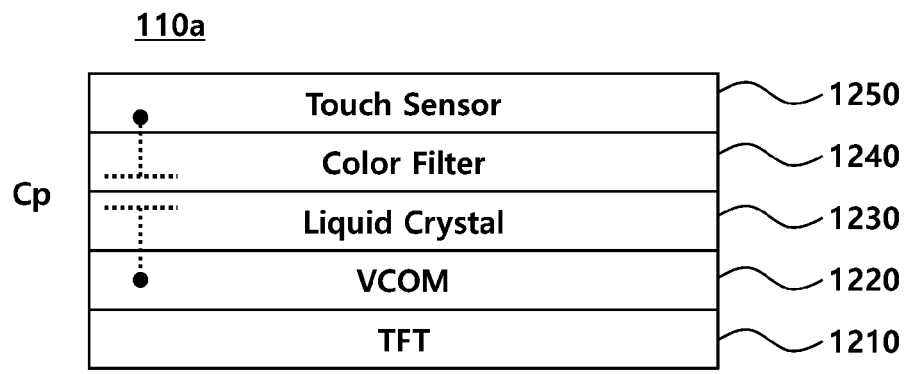
FIG. 12 is a block diagram of an embodiment in a case when a panel according to an embodiment of the present disclosure is an LCD panel.

FIG. 12 is a block diagram of an embodiment in a case when a panel according to an embodiment of the present disclosure is an LCD panel.

Referring to FIG. 12, the panel 110a may comprise a thin film transistor (TFT) substrate 1210, a common electrode layer (VCOM) 1220, a liquid crystal layer 1230, a color filter layer 1240, and a touch sensor layer 1250.

Transistors and pixel electrodes to be disposed in pixels may be disposed on the TFT substrate 1210 and common electrodes may be disposed on the common electrode layer 1220. The TFT substrate 1210 and the common electrode layer 1220 may be called together a display electrode layer.

On the display electrode layer, display electrodes—gate lines, data lines, common electrodes, etc—may be disposed. A liquid crystal layer 1230 and/or a color filter layer 1240 may be interposed between the display electrode layer and the touch sensor layer 1250. Such a liquid crystal layer 1230 and/or a color filter layer 1240 may cause a parasitic capacitance Cp to be formed between a display electrode and a touch sensor.

A touch driving signal and a downlink signal formed in the touch sensor layer 1250 may be affected by the parasitic capacitance Cp. In a display device according to an embodiment, when a touch driving signal and a downlink signal are formed in the touch sensor layer 1250, the influence of the aforementioned parasitic capacitance may be minimized by floating the display electrode or by supplying a modulation signal to the display electrode.

Figure 13:
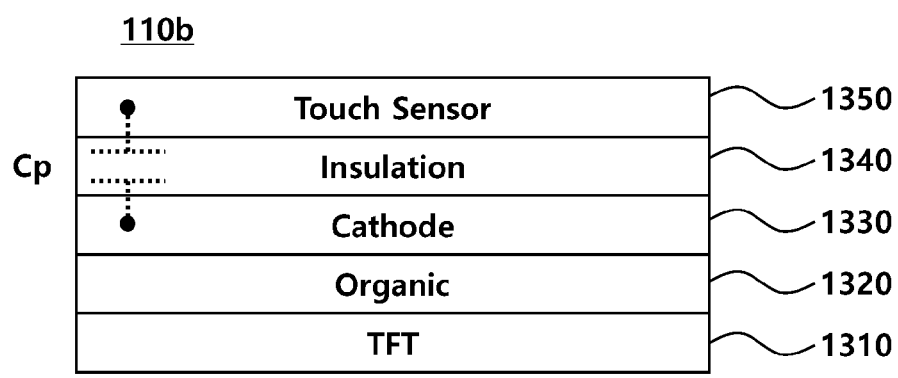
FIG. 13 is a block diagram of an embodiment in a case when a panel according to an embodiment of the present disclosure is an OLED panel.

FIG. 13 is a block diagram of an embodiment in a case when a panel according to an embodiment of the present disclosure is an OLED panel.

Referring to FIG. 13, the panel 110b may comprise a TFT substrate 1310, an organic light emitting substance layer 1320, a cathode electrode layer 1330, an insulation layer 1340, and a touch sensor layer 1350.

On the TFT substrate 1310, transistors and anode electrodes disposed in pixels may be disposed, and on the organic light emitting substance layer 1320, organic light emitting substance, which emits light by electric energy may be disposed. On the cathode electrode layer 1330, cathode electrodes supplying base voltages to the OLED may be disposed. The TFT substrate 1310, the organic light emitting substance layer 1320, and the cathode electrode layer 1330 may be called together a display electrode layer.

On the display electrode layer, display electrodes—gate lines, data lines, anode electrodes, cathode electrodes, etc.—may be disposed. An insulation layer 1340 may be interposed between the display electrode layer and the touch sensor layer 1350. Such an insulation layer 1340 may cause a parasitic capacitance Cp to be formed between a display electrode and a touch sensor.

A touch driving signal and a downlink signal formed in the touch sensor layer 1350 may be affected by the parasitic capacitance Cp. In a display device according to an embodiment, when a touch driving signal and a downlink signal are formed in the touch sensor layer 1350, the influence of the aforementioned parasitic capacitance may be minimized by floating the display electrode or by supplying a modulation signal to the display electrode.

According to the present embodiment, as described above, the characteristic of downlink signals received from the active pen may be improved.

Since terms, such as "including," "comprising," and "having" mean that corresponding elements may exist unless they are specifically described to the contrary, it shall be construed that other elements can be additionally included, rather than that such elements are omitted. All technical, scientific or other terms are used consistently with the meanings as understood by a person skilled in the art unless defined to the contrary. Common terms as found in dictionaries should be interpreted in the context of the related technical writings, rather than overly ideally or impractically, unless the present disclosure expressly defines them so.

Although one embodiment of the present disclosure has been described for illustrative purposes, those skilled in the art will appreciate that various modifications, additions and substitutions are possible, without departing from the scope and spirit of the embodiment as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch driving device, which transmits uplink signals to a touch pen and receives downlink signals from the touch pen, comprising:
  a touch driving part for transmitting the uplink signals through a touch sensor; and
  a touch sensing part for receiving the downlink signals through the touch sensor,
  wherein a display electrode coupled with the touch sensor by a parasitic capacitance is floated in a time interval in which the downlink signals are received, and the display electrode is not floated in a time interval in which the uplink signals are transmitted, and
  wherein the touch pen synchronizes an internal clock according to the uplink signal and determines timing for transmitting the downlink signal according to the internal clock.

2. The touch driving device of claim 1, wherein the touch driving part supplies a touch driving signal to the touch sensor, the touch sensing part receives a response signal corresponding to the touch driving signal to sense a proximity or touch of an external object to or on the touch sensor, a modulation signal having a phase the same as that of the touch driving signal or different from that thereof by 180 degrees is supplied to the display electrode in a time interval in which the touch driving signal is supplied to the display electrode.

3. The touch driving device of claim 1, wherein the downlink signal is transmitted from the touch pen to the touch sensor through a capacitance formed between the touch pen and the touch sensor.

4. The touch driving device of claim 1, wherein the display electrode is a common electrode to which a common voltage is supplied in a liquid crystal display (LCD) panel, or the display electrode is a data line to which a data voltage is supplied or a gate line to which a scan signal is supplied in the LCD panel.

5. The touch driving device of claim 1, wherein the display electrode is a cathode electrode of an organic light emitting diode (OLED) panel, or the display electrode is a driving voltage line supplying driving voltages to each OLED.

6. The touch driving device of claim 1, wherein the uplink signal includes display panel information or a synchronization signal, and the downlink signal includes status information of the touch pen.

7. The touch driving device of claim 1, wherein a display driving voltage required for driving each pixel is supplied to the display electrode in a display time interval; a touch driving signal is supplied to the touch sensor and a modulation signal having a phase same as that of the touch driving signal or different from that thereof by 180 degrees is supplied to the display electrode in a first touch time interval; and the downlink signal is received by the touch sensor and the display electrode is floated in a second touch time interval.

8. A display device comprising:
  a display electrode layer on which a display electrode is disposed;
  a touch sensor layer on which a touch sensor is disposed;
  a display driving device configured to supply display driving voltages to the display electrode; and a touch driving device configured to transmit uplink signals to a touch pen through the touch sensor and receive downlink signals from the touch pen, wherein a parasitic capacitance is formed between the display electrode and the touch sensor, and when the touch driving device receives the downlink signals, the display electrodes are floated, and when the touch driving device transmits the uplink signals, the display electrodes are not floated, wherein the touch pen synchronizes an internal clock according to the uplink signal and determines timing for transmitting the downlink signal according to the internal clock.

9. The display device of claim 8, wherein the display electrode is a common electrode and a liquid crystal layer or a color filter layer is interposed between the display electrode and the touch sensor.

10. The display device of claim 8, wherein the display electrode is a common electrode, the common electrode is connected with a common voltage supplying device for supplying common voltages, and the common voltage supplying device cuts off the common voltage and floats the common electrode when the downlink signal is received.

11. The display device of claim 8, wherein the display electrode is a cathode electrode of an organic light emitting diode OLED panel, and an insulation film is interposed between the display electrode and the touch sensor.

12. The display device of claim 11, wherein the cathode electrode is connected with a base voltage supplying device for supplying base voltages, and the base voltage supplying device cuts off the base voltage and floats the cathode electrode when the downlink signal is received.

13. The display device of claim 8, wherein, in the display driving device, the display driving voltage is supplied to the display electrode in a display time interval; a modulation signal having a phase same as that of the touch driving signal or different from that thereof by 180 degrees is supplied to the display electrode when the touch driving device supplies a touch driving signal to the touch sensor; and the display electrode is floated when the downlink signal is received by the touch sensor.

* * * * *